United States Patent [19]

Schwinghammer

[11] Patent Number: 5,075,123
[45] Date of Patent: Dec. 24, 1991

[54] PROCESS AND APPARATUS FOR REMOVING ALCOHOL FROM BEVERAGES

[75] Inventor: Günter Schwinghammer, Dortmund, Fed. Rep. of Germany

[73] Assignee: H & K Processtechnik, GmbH, Dortmund, Fed. Rep. of Germany

[21] Appl. No.: 658,991

[22] Filed: Feb. 21, 1991

[30] Foreign Application Priority Data

Sep. 29, 1990 [DE] Fed. Rep. of Germany ....... 4030927

[51] Int. Cl.$^5$ .......................... C12F 3/00; B01D 63/00
[52] U.S. Cl. .................................... 426/493; 210/644; 210/648; 210/653; 426/14; 426/592
[58] Field of Search ............... 426/592, 493, 386, 425, 426/14, 524; 210/644, 645, 648, 651, 653, 669

[56] References Cited

U.S. PATENT DOCUMENTS

| | | | |
|---|---|---|---|
| 4,581,236 | 4/1986 | Bandel et al. | 426/592 |
| 4,664,918 | 5/1987 | Tilgner et al. | 426/14 |
| 4,804,554 | 2/1989 | Barth | 426/592 |
| 4,867,997 | 9/1989 | Wiesenberger et al. | 426/592 |

Primary Examiner—George Yeung
Attorney, Agent, or Firm—Nils H. Ljungman & Associates

[57] ABSTRACT

A process and apparatus for removing alcohol from beverages includes removing alcohol from the beverage to a dialysate by dialysis in a dialysis chamber, and then removing the alcohol from the dialysate by vacuum in a vacuum stripping column, wherein the dialysate is cooled in a heat exchanger and thereafter in a cooling device prior to entry of the dialysate into the dialysis chamber and the dialysate is heated in the heat exchanger and thereafter in a heater prior to removal of the alcohol from the dialysate by vacuum.

20 Claims, 3 Drawing Sheets

PROCESS AND APPARATUS FOR REMOVING ALCOHOL FROM BEVERAGES

BACKGROUND OF THE INVENTION

1. Field of the Invention

The invention relates to a process as well as to an apparatus for removing alcohol from beverages. Such de-alcoholizing is used for the production of low-alcohol and/or non-alcoholic beer from ready-to-fill original beer. The de-alcoholizing is preferably done by removing the alcohol, at least partially, through the use of dialysis membranes in dialysis modules which dialysis modules remove alcohol because of the alcohol concentration gradient between the beverage on one side of the membrane and a dialysate on the other side of the membrane.

2. Background Information

In a dialysis module, substances are transferred from one fluid, such as a beverage, to another, the dialysate, through a membrane because of a concentration driving force. The dialysate, which generally has little or no concentration of the substances being removed, is circulated through the dialysis module where the dialysate picks up at least a portion of the substances being removed, which in this case is alcohol. The dialysate, after becoming enriched with alcohol in the dialysis module, can then, if desired, be subsequently fed through an alcohol stripping column, or rectification column, where the dialysate is freed of at least a portion of the diffused alcohol.

In order to maintain the taste of the low-alcohol beverage that is being produced as closely as possible to the taste of the original beverage, it is preferable that the dialysate be chosen such that the dialysate is the low-alcohol beverage so that the only difference between the beverage and the dialysate is the alcohol content. Thus, substantially only alcohol will flow across the dialysis membrane in the dialysis module. It is therefore desirable to maintain all of the ingredients in the dialysate as are present in the beverage, because if an ingredient in the dialysate is removed, ie. in the rectification column, that ingredient can also ultimately be removed from the beverage as well, because that ingredient can now also flow across the dialysis membrane under its own concentration gradient.

The alcohol can be expelled from the dialysate in the rectification column at medium temperatures under vacuum conditions, and the alcohol can then subsequently be condensed in a condenser and discharged from the system. In order to heat the dialysate to the temperature needed for the alcohol removal step, a regenerative heat exchanger is preferably arranged between the dialysis modules and the rectification column. Thus, dialysate of high-alcohol content, going to the rectification column, can be heated to the required inlet temperature by acquiring heat from the dialysate of low-alcohol content coming out of the rectification column.

Because of the comparatively high temperature needed in the rectification column to efficiently remove the alcohol, the dialysate of low alcohol content coming out of the rectification column, which dialysate then enters the feed region of the dialysis column when the dialysate is continuously cycled, has a comparatively high temperature and thus, germs and their corresponding metabolic products can form which could give a disagreeable taste to the beverage being treated. On the other hand, if the temperature in the feed region of the dialysis column is reduced, the temperature of the dialysate entering the rectification column from the dialysis column is usually not high enough and, depending on the composition of the respective beverage being treated, ie. if the beverage being treated were beer, increased foaming would result in the region of the rectification column. Due to this increase in foaming, the valuable substances of the dialysate, and thus ultimately the beverage, could also be removed from the dialysate when the dialysate is subjected to the vacuum conditions for removal of the alcohol. The preferable replacement of these valuable substances in the dialysate would then require repeated enrichment of these substances in the region of the dialysis module, and thus, undesired changing and influencing of the beverage taste would be unavoidable.

OBJECT OF THE INVENTION

The object of the present invention is to thus provide remedy and improvement which, on the one hand, avoids critical temperatures in the feed region of the dialysis column and, on the other hand, prevents valuable substances from being removed in the region of the rectification column.

SUMMARY OF THE INVENTION

In accordance with the present invention, there is provided, in addition to a regenerative heat exchanger for both heating and cooling the dialysate, at least one of: an additional cooler for providing further cooling of the dialysate prior to its entry into the dialysis column, and an additional heater for providing further heating of the dialysate prior to removing the alcohol from the dialysate in the rectification column.

Furthermore, it is proposed that cooling of the dialysate lies possibly within a range of about 8° C. to about 20° C. below the temperature at which the dialysate emerges from the rectification column, and that the subsequent heating heats the dialysate to a temperature which generally exceeds the temperature attainable through regenerative heat exchange.

The method as proposed herein essentially eliminates the disadvantages described above. Reduced foaming and a comparatively rapid destabilization and destruction of the foam are essentially ensured, in particular, in the region of the rectification column so that, as a whole, foaming is virtually prevented and the valuable substances enriched in the dialysate are therefore not removed by the vacuum in the rectification column. Also germ formation is kept at a minimum in the feed region of the dialysis column.

Thus, a comparatively stable dialysate is obtained which virtually picks up only negligible amounts of the valuable substances of the respective beverage in the dialysis module, while removing the desired amount of alcohol.

One aspect of the invention resides broadly in an apparatus for removing at least a portion of the alcohol from a beverage, the apparatus comprising: a cooler for cooling an alcohol removing liquid, the cooler comprising: a first heat exchanger for pre-cooling the alcohol removing liquid to thereby produce a pre-cooled alcohol removing liquid, and a second heat exchanger for further cooling the pre-cooled alcohol removing liquid to thereby produce a cooled alcohol removing liquid; apparatus for removing at least a portion of the alcohol from the beverage by transferring the at least a portion of the alcohol from the beverage to the cooled alcohol removing liquid to thereby produce at least partially de-alcoholized beverage and alcohol-enriched alcohol removing liquid: device for conducting the cooled alcohol removing liquid from the cooler to the apparatus for removing at least a portion of the alcohol from the beverage; a heater for heating the alcohol-enriched alcohol removing liquid from the apparatus for removing at least a portion of the alcohol from the beverage, the heater for producing a heated, alcohol-enriched alcohol removing liquid; device for conducting the alcohol-enriched alcohol removing liquid from the apparatus for removing at least a portion of the alcohol from the beverage to the heater; device for removing at least a portion of the alcohol from the heated, alcohol-enriched alcohol removing liquid to thereby produce further alcohol removing liquid; device for conducting the heated alcohol-enriched alcohol removing liquid from the heater to the apparatus for removing at least a portion of the alcohol from the heated alcohol-enriched alcohol removing liquid: and device for conducting the further alcohol removing liquid from the apparatus for removing alcohol from the heated, alcohol-enriched alcohol removing liquid to the cooler.

Another aspect of the invention resides broadly in an apparatus for removing at least a portion of the alcohol from a beverage, the apparatus comprising: a cooler for cooling an alcohol removing liquid to thereby produce cooled alcohol removing liquid: a dialysis chamber for removing at least a portion of the alcohol from the beverage by transferring the at least a portion of the alcohol from the beverage to the cooled alcohol removing liquid to thereby produce at least partially de-alcoholized beverage and alcohol-enriched alcohol removing liquid: device for conducting the cooled alcohol removing liquid from the cooler to the dialysis chamber: a heater for heating the alcohol-enriched alcohol removing liquid from the dialysis chamber, the heater comprising: a first heat exchanger for pre-heating the alcohol-enriched alcohol removing liquid from the dialysis chamber to thereby produce pre-heated, alcohol-enriched alcohol removing liquid, and a second heat exchanger for heating the pre-heated, alcohol-enriched alcohol removing liquid from the first heat exchanger to thereby produce heated, alcohol-enriched alcohol removing liquid; device for conducting the alcohol-enriched alcohol removing liquid from the dialysis chamber to the heater: apparatus for removing at least a portion of the alcohol from the heated, alcohol-enriched alcohol removing liquid to thereby produce further alcohol removing liquid; device for conducting the heated, alcohol-enriched alcohol removing liquid from the heater to the apparatus for removing at least a portion of the alcohol from the heated alcohol-enriched alcohol removing liquid: and device for conducting the further alcohol removing liquid from the apparatus for removing alcohol from the heated, alcohol-enriched alcohol removing liquid to the cooler.

Yet another aspect of the invention resides broadly in a method for removing at least a portion of the alcohol from a beverage, the method comprising the steps of: cooling an alcohol removing liquid in a cooler, the cooling comprising: pre-cooling the alcohol removing liquid in a first heat-exchanger to produce pre-cooled alcohol removing liquid, and further cooling the pre-cooled alcohol removing liquid in a second heat exchanger to produce cooled alcohol removing liquid; conducting the cooled alcohol removing liquid from the cooler and a beverage to a dialysis chamber to remove at least a portion of the alcohol from the beverage: transferring at least a portion of the alcohol from the beverage to the cooled alcohol removing liquid in the dialysis chamber to thereby produce at least partially de-alcoholized beverage and alcohol-enriched alcohol removing liquid: conducting the alcohol-enriched alcohol removing liquid from the dialysis chamber to a heater; heating the alcohol-enriched alcohol removing liquid from the dialysis chamber in the heater, thereby producing heated, alcohol-enriched alcohol removing liquid; conducting the heated, alcohol-enriched alcohol removing liquid from the heater to an apparatus for removing at least a portion of the alcohol from the heated, alcohol-enriched alcohol removing liquid; removing at least a portion of the alcohol from the heated, alcohol-enriched alcohol removing liquid from the heater in the apparatus for removing at least a portion of the alcohol from the heated, alcohol-enriched alcohol removing liquid to thereby produce further alcohol removing liquid; and conducting the further alcohol removing liquid from the apparatus for removing at least a portion of the alcohol from the heated, alcohol-enriched alcohol removing liquid to the cooler.

A further aspect of the invention resides broadly in a method for removing at least a portion of the alcohol from a beverage, the method comprising the steps of: cooling an alcohol removing liquid in a cooler to produce cooled alcohol removing liquid; conducting the cooled alcohol removing liquid from the cooler and a beverage to apparatus for removing at least a portion of the alcohol from the beverage; transferring at least a portion of the alcohol from the beverage to the cooled alcohol removing liquid in the apparatus for removing at least a portion of the alcohol from the beverage to thereby produce at least partially de-alcoholized beverage and alcohol-enriched alcohol removing liquid; conducting the alcohol-enriched alcohol removing liquid from the apparatus for removing at least a portion of the alcohol from the beverage to a heater; heating the alcohol-enriched alcohol removing liquid from the apparatus for removing at least a portion of the alcohol from the beverage in the heater, the heating comprising: pre-heating the alcohol-enriched alcohol removing liquid from the apparatus for removing at least a portion of the alcohol from the beverage in a first heat exchanger to thereby produce pre-heated, alcohol-enriched alcohol removing liquid, and heating the pre-heated alcohol enriched alcohol removing liquid from the first heat exchanger in a second heat exchanger to thereby produce heated, alcohol-enriched alcohol removing liquid: conducting the heated, alcohol-enriched alcohol removing liquid from the heater to apparatus for removing at least a portion of the alcohol from the heated, alcohol-enriched alcohol removing liquid; removing at least a portion of the alcohol from the heated, alcohol-enriched alcohol removing liquid from the heater in the apparatus for removing at least a portion of the alcohol from the heated, alcohol-enriched alcohol removing liquid to thereby produce further alcohol removing liquid: and conducting the further alcohol removing liquid from the apparatus for removing at least a portion of the alcohol from the heated, alcohol-enriched alcohol removing liquid to the cooler.

BRIEF DESCRIPTION OF THE DRAWINGS

The device for removing alcohol from a beverage is shown in detail by the following drawings, in which.

DESCRIPTION OF THE PREFERRED EMBODIMENTS

In accordance with the drawings, a basic dialysis plant essentially comprises a dialysis module 1, a regenerative heat exchanger 3 where dialysate is run against dialysate, and a rectification column 5.

Figure 2:
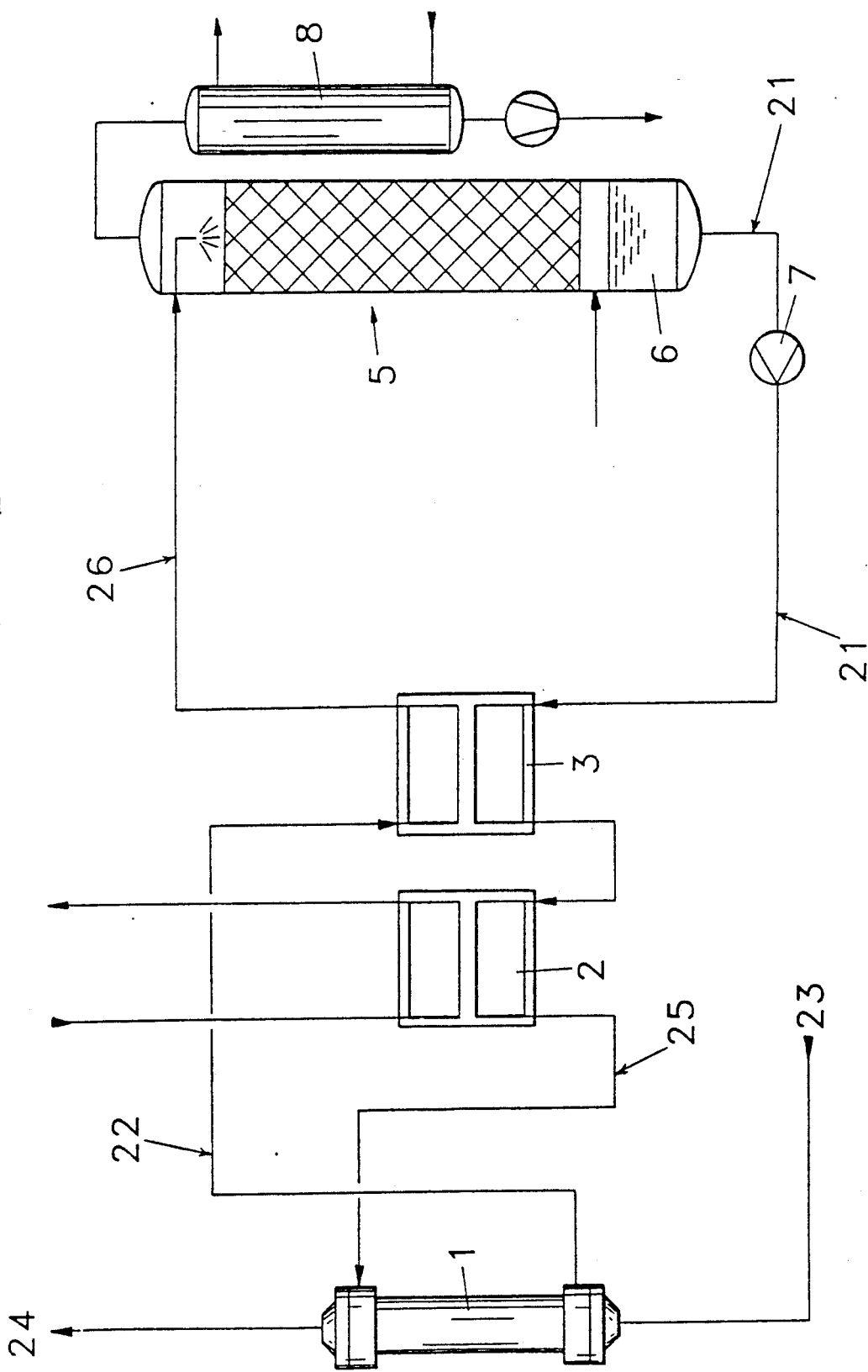
FIG. 2 shows a dialysis plant having additional cooling apparatus.

As shown in FIG. 2, the dialysis plant may preferably have an additional dialysate cooler 2 positioned between the dialysis module 1 and the heat exchanger 3. Thus, the dialysate of low-alcohol content 21 emerging from the sump 6 of the rectification column 5 is at first fed by means of a pump 7 through the regenerative heat exchanger 3 for an initial cooling and then preferably flows through the dialysate cooler 2, finally entering the dialysis module 1. With the additional cooler 2 to cool the dialysate 21, a lower temperature dialysate 25 is essentially achieved. At this lower temperature, the growth of germs and their production of their metabolic products is inhibited, which germs and metabolic products could ultimately affect the taste of the beverage.

In the dialysis module 1, the cooled, low-alcohol dialysate 25 is essentially enriched with alcohol from the alcohol-enriched beverage 23 to thus produce a quantity of at least partially de-alcoholized beverage 24 and alcohol-enriched dialysate 22. After the transfer of alcohol, the alcohol-enriched dialysate 22 flows back to the regenerative heat exchanger 3, where it preferably gets heated by the low-alcohol feed dialysate 21 in the manner mentioned above. Thereafter, the heated alcohol-enriched dialysate 26 is preferably conducted to the rectification column 5, where at least a portion of the alcohol can be removed from the alcohol-enriched dialysate 26 by suction. The removed alcohol can then preferably be condensed in a condenser 8, which condenser is preferably disposed in a position subsequent to the de-alcoholization system. From the condenser, the alcohol can then be carried off.

Figure 3:
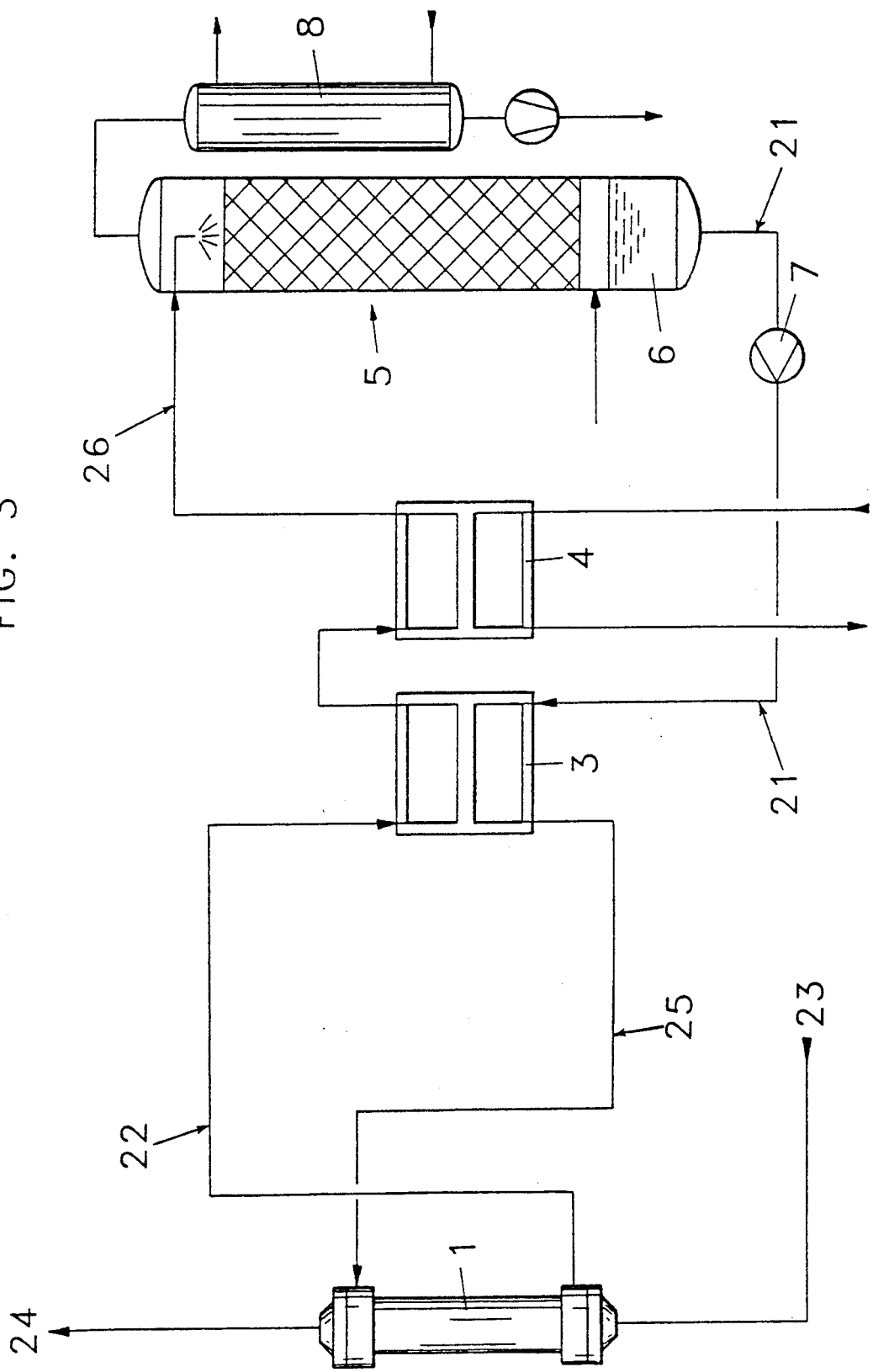
FIG. 3 shows a dialysis plant having additional heating apparatus.

In accordance with a second embodiment of the invention, FIG. 3 shows a basic dialysis plant with an additional dialysate heater 4 preferably positioned between the heat exchanger 3 and the rectification column 5. This dialysate heater 4 heats the dialysate to preferably the temperature prevailing in the column 5 or to a higher temperature to achieve optimum foam abatement in the rectification column. Thus, since foaming is essentially inhibited, less of the essential components of the beverage will be drawn off by the vacuum in the rectification column 5.

Figure 1:
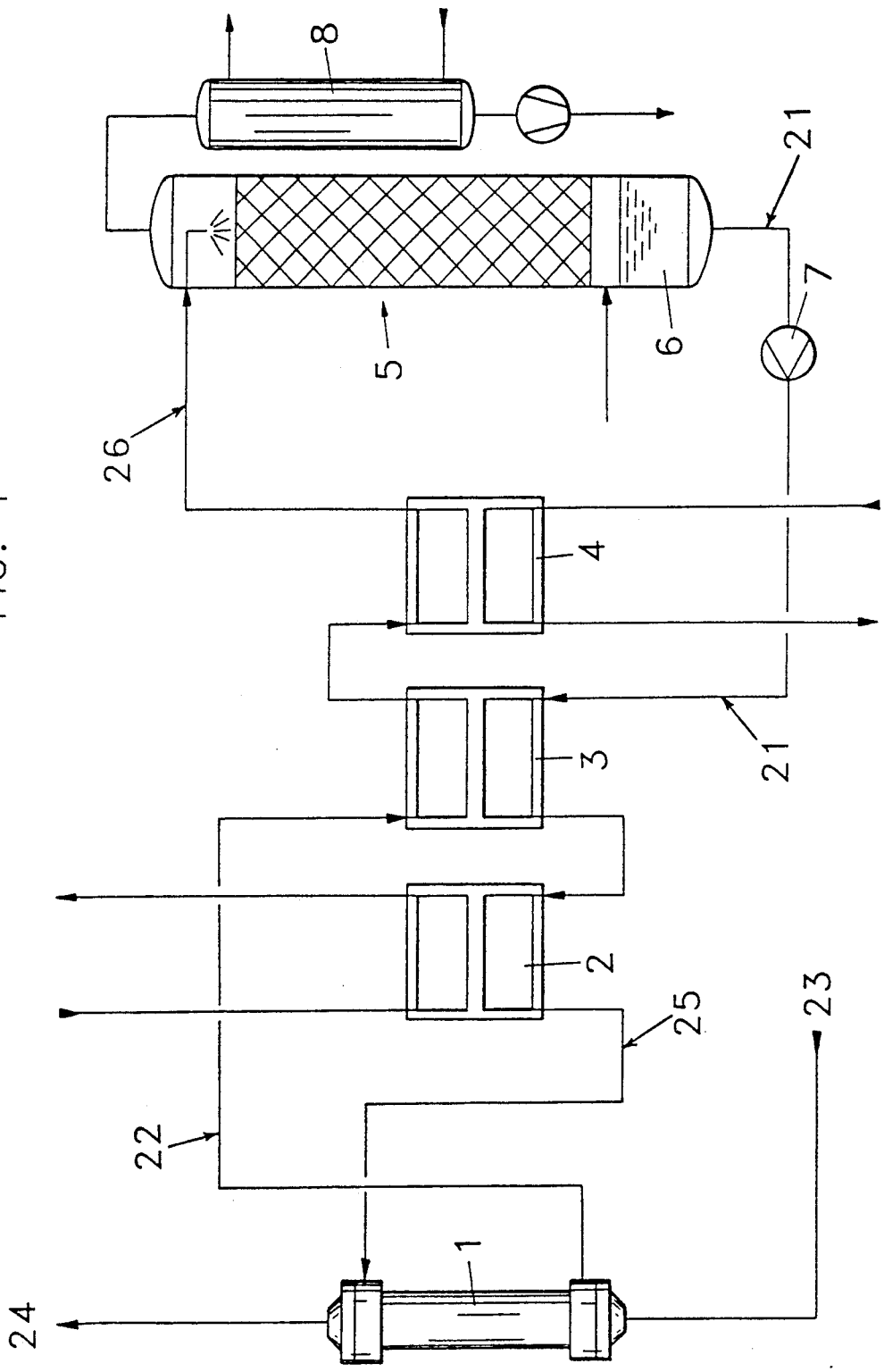
FIG. 1 shows a dialysis plant having both an additional cooling and an additional heating apparatus of the present invention.

The embodiment of the present invention as shown in FIG. 1 shows a dialysis plant which is a combination of the dialysis plants of FIGS. 2 and 3, that is, the plant of FIG. 1 includes both the additional dialysate cooler 2 and the additional dialysate heater 4. Thus, if necessary, both the inhibition of germ growth at the dialysis column 1 and the inhibition of foaming in the rectification column 5 can be achieved.

In summary, one feature of the invention resides broadly in a method of de-alcoholizing beverages, for example, for the production of low-alcohol and/or non-alcoholic beer using ready-to-fill original beer, in which through the use of membranes in dialysis modules, alcohol is at least partially removed on account of the alcohol concentration gradient with respect to the dialysate on the other membrane side. This dialysate is cooled prior to entry into the dialysis module and heated in a regenerative heat exchanger in a known manner after passing through the module. Thereafter, it is heated in another heat exchanger possibly to the temperature required for rectification or to a higher temperature.

Another feature of the invention resides broadly in a method wherein cooling of the dialysate lies within a range of about 8° C. to about 20° C. and subsequent heating is effected at a temperature exceeding the temperature attainable through regenerative heat exchange.

Yet another feature of the invention resides broadly in a device for carrying out the method, the device comprising dialysis modules and a condenser with heat exchangers arranged in between, wherein a dialysate cooler 2 is arranged between the regenerative heat exchanger 3 and the dialysis modules 1, on the one hand, and a dialysate heater 4 is located between the regenerative heat exchanger 3 and the rectification column 5, on the other.

Art hereby incorporated as reference includes U.S. Pat. No. 4,804,554 to Norbert Barth entitled "Process for the Production of Fermented Drinks with Reduced Alcohol Content", No. 4,664,918 to Hans Tigner and Franz Schmitz entitled "Process for Reducing Alcohol in Fermented Beverages by Means of Dialysis", and No. 4,581,236 to Warner Bandel et al. entitled "Process and Apparatus for Reduction of Alcohol by Dialysis in Fermented Beverages.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Apparatus for removing at least a portion of the alcohol from a beverage, said apparatus comprising:
    cooling means for cooling an alcohol removing liquid, said cooling means comprising:
        first heat exchange means for pre-cooling the alcohol removing liquid to thereby produce a pre-cooled alcohol removing liquid: and
        second heat exchange means for further cooling the pre-cooled alcohol removing liquid to thereby produce a cooled alcohol removing liquid;
    means for removing at least a portion of the alcohol from the beverage by transferring the at least a portion of the alcohol from the beverage to the cooled alcohol removing liquid to thereby produce at least partially de-alcoholized beverage and alcohol-enriched alcohol removing liquid:

means for conducting the cooled alcohol removing liquid from said cooling means to said means for removing at least a portion of the alcohol from the beverage;

heating means for heating the alcohol-enriched alcohol removing liquid from said means for removing at least a portion of the alcohol from the beverage, said heating means for producing a heated, alcohol-enriched alcohol removing liquid;

means for conducting the alcohol-enriched alcohol removing liquid from said means for removing at least a portion of the alcohol from the beverage to said heating means;

means for removing at least a portion of the alcohol from the heated, alcohol-enriched alcohol removing liquid to thereby produce further alcohol removing liquid;

means for conducting the heated alcohol-enriched alcohol removing liquid from said heating means to said means for removing at least a portion of the alcohol from the heated alcohol-enriched alcohol removing liquid; and means for conducting the further alcohol removing liquid from said means for removing alcohol from the heated, alcohol-enriched alcohol removing liquid to said cooling means.

2. The apparatus according to claim 1, wherein:
said heating means comprises said first heat exchange means;
said first heat exchange means comprises means for transferring heat from the alcohol removing liquid from said means for removing at least a portion of the alcohol from the alcohol removing liquid to the alcohol-enriched alcohol removing liquid from said means for removing at least a portion of the alcohol from the beverage;
said second heat exchange means comprises means for transferring heat from the pre-cooled alcohol removing liquid from said first heat exchange means to a cooling liquid; and
said apparatus further comprises:
means for conducting the alcohol removing liquid from said means for removing at least a portion of the alcohol from the heated, alcohol-enriched alcohol removing liquid to said first heat exchange means;
means for conducting the alcohol removing liquid from said first heat exchange means to said second heat exchange means; and
means for conducting the cooled alcohol-removing liquid from said second heat exchange means to said means for removing at least a portion of the alcohol from the beverage.

3. The apparatus according to claim 2, further including:
a condenser for condensing the at least a portion of the alcohol removed from the heated, alcohol-enriched alcohol removing liquid in said means for removing at least a portion of the alcohol from the heated, alcohol-enriched alcohol removing liquid;
means for conducting the at least a portion of the alcohol removed from the heated, alcohol-enriched alcohol removing liquid to the condenser:
a third heat exchange means for additionally heating the heated alcohol-enriched alcohol removing liquid from said first heat exchange means prior to said removing at least a portion of the alcohol from the heated alcohol-enriched alcohol removing liquid in said means for removing at least a portion of the alcohol from the heated alcohol-enriched alcohol removing liquid; and
means for conducting the heated alcohol-enriched alcohol removing liquid from said first heat exchange means to said third heat exchange means and from said third heat exchange means to said means for removing at least a portion of the alcohol from the heated, alcohol-enriched alcohol removing liquid.

4. The apparatus according to claim 3, wherein:
said means for removing at least a portion of the alcohol from the beverage comprises at least one dialysis chamber; and
said means for removing at least a portion of the alcohol from the heated alcohol-enriched alcohol removing liquid comprises at least one vacuum stripping column.

5. The apparatus according to claim 4, wherein:
said heating means is for heating the alcohol-enriched alcohol removing liquid from said means for removing at least a portion of the alcohol from the beverage to a temperature of at least one of:
an operating temperature of said vacuum stripping column, and
a temperature greater than the operating temperature of said vacuum stripping column; and
said cooling means is for cooling the alcohol removing liquid from said means for removing at least a portion of the alcohol from the heated alcohol removing liquid about 8° to about 20° below a temperature at which the alcohol removing liquid emerges from said vacuum stripping column.

6. Apparatus for removing at least a portion of the alcohol from a beverage, said apparatus comprising:
cooling means for cooling an alcohol removing liquid to thereby produce cooled alcohol removing liquid:
at least one dialysis chamber for removing at least a portion of the alcohol from the beverage by transferring the at least a portion of the alcohol from the beverage to the cooled alcohol removing liquid to thereby produce at least partially de-alcoholized beverage and alcohol-enriched alcohol removing liquid;
means for conducting the cooled alcohol removing liquid from said cooling means to said at least one dialysis chamber:
heating means for heating the alcohol-enriched alcohol removing liquid from said at least one dialysis chamber, said heating means comprising:
first heat exchange means for pre-heating the alcohol-enriched alcohol removing liquid from said at least one dialysis chamber to thereby produce pre-heated, alcohol-enriched alcohol removing liquid, and
second heat exchange means for heating the pre-heated alcohol-enriched alcohol removing liquid from said first heat exchange means to thereby produce heated, alcohol-enriched alcohol removing liquid;
means for conducting the alcohol-enriched alcohol removing liquid from said at least one dialysis chamber to said heating means;

means for removing at least a portion of the alcohol from the heated, alcohol-enriched alcohol removing liquid to thereby produce further alcohol removing liquid;

means for conducting the heated, alcohol-enriched alcohol removing liquid from said heating means to said means for removing at least a portion of the alcohol from the heated alcohol-enriched alcohol removing liquid: and means for conducting the further alcohol removing liquid from said means for removing alcohol from the heated, alcohol-enriched alcohol removing liquid to said cooling means.

7. The apparatus according to claim 6, wherein:

said cooling means comprises said first heat exchange means:

said first heat exchange means comprises means for transferring heat from the alcohol removing liquid from said means for removing at least a portion of the alcohol from the heated, alcohol-enriched alcohol removing liquid to the alcohol-enriched alcohol removing liquid from said at least one dialysis chamber:

said second heat exchange means comprises means for transferring heat from a heating liquid to the pre-heated alcohol removing liquid from said first heat exchange means: and said apparatus further comprises:
means for conducting the alcohol-enriched alcohol removing liquid from said at least one dialysis chamber to said first heat exchange means;
means for conducting the heated alcohol-enriched alcohol removing liquid from the first heat-exchange means to said second heat exchange means; and
means for conducting the heated alcohol-enriched alcohol removing liquid from the second heat exchange means to said means for removing at least a portion of the alcohol from the heated, alcohol-enriched alcohol removing liquid.

8. The apparatus according to claim 7, further including:

a condenser for condensing the at least a portion of the alcohol removed from the heated, alcohol-enriched alcohol removing liquid in the means for removing at least a portion of the alcohol from the heated, alcohol-enriched alcohol removing liquid;

means for conducting the at least a portion of the alcohol removed from the heated, alcohol-enriched alcohol removing liquid to the condenser;

a third heat exchange means for additionally cooling the cooled alcohol-enriched alcohol removing liquid from said first heat exchange means prior to said removing at least a portion of the alcohol from the beverage in said at least one dialysis chamber; and means for conducting the further alcohol removing liquid from said first heat exchange means to said third heat exchange means and from said third heat exchange means to said means for removing at least a portion of the alcohol from the beverage.

9. The apparatus according to claim 8, wherein:

said means for removing at least a portion of the alcohol from the heated alcohol-enriched alcohol removing liquid comprises at least one vacuum stripping column.

10. The apparatus according to claim 9, wherein:

said heating means is for heating the alcohol-enriched alcohol removing liquid from said at least one dialysis chamber to a temperature of at least one of:
an operating temperature of said vacuum stripping column, and
a temperature greater than the operating temperature of
said vacuum stripping column; and said cooling means is for cooling the alcohol removing liquid from said means for removing at least a portion of the alcohol from the heated alcohol-enriched alcohol removing liquid about 8° to about 20° below a temperature at which the alcohol removing liquid emerges from said vacuum stripping column.

11. A method for removing at least a portion of the alcohol from a beverage, said method comprising the steps of:

cooling an alcohol removing liquid in a cooling means, said cooling comprising:
pre-cooling the alcohol removing liquid in a first heat-exchange means to produce pre-cooled alcohol removing liquid, and
further cooling the pre-cooled alcohol removing liquid in a second heat exchange means to produce cooled alcohol removing liquid;

conducting the cooled alcohol removing liquid from said cooling means and a beverage to at least one dialysis chamber to remove at least a portion of the alcohol from the beverage:

transferring at least a portion of the alcohol from the beverage to the cooled alcohol removing liquid in said at least one dialysis chamber to thereby produce at least partially de-alcoholized beverage and alcohol-enriched alcohol removing liquid:

conducting the alcohol-enriched alcohol removing liquid from said at least one dialysis chamber to a heating means:

heating the alcohol-enriched alcohol removing liquid from said at least one dialysis chamber in said heating means, thereby producing heated, alcohol-enriched alcohol removing liquid:

conducting the heated, alcohol-enriched alcohol removing liquid from said heating means to a means for removing at least a portion of the alcohol from the heated, alcohol-enriched alcohol removing liquid;

removing at least a portion of the alcohol from the heated, alcohol-enriched alcohol removing liquid from said heating means in said means for removing at least a portion of the alcohol from the heated, alcohol-enriched alcohol removing liquid to thereby produce further alcohol removing liquid: and conducting the further alcohol removing liquid from said means for removing at least a portion of the alcohol from the heated, alcohol-enriched alcohol removing liquid to said cooling means.

12. The method according to claim 10, wherein:

said heating comprises heating the alcohol-enriched alcohol removing liquid in said first heat exchange means:

said heating in said first heat exchange means comprises transferring heat from the alcohol removing liquid from said means for removing at least a portion of the alcohol from the heated, alcohol-enriched alcohol removing liquid to the alcohol-enriched alcohol removing liquid from said at least one dialysis chamber; and said further cooling the pre-cooled alcohol removing liquid in said second heat exchange means comprises transferring heat from the pre-cooled alcohol removing liquid to a cooling liquid.

13. The method according to claim 12, further including:

condensing, in a condenser, the at least a portion of the alcohol removed from the heated, alcohol-enriched alcohol removing liquid in said means for removing at least a portion of the alcohol from the heated, alcohol-enriched alcohol removing liquid; and additionally heating the heated, alcohol-enriched alcohol removing liquid from said first heat exchange means in a third heat exchange means prior to said removing at least a portion of the alcohol from the heated, alcohol-enriched alcohol removing liquid in said means for removing at least a portion of the alcohol from the heated, alcohol-enriched alcohol removing liquid.

14. The method according to claim 13, wherein said removing at least a portion of the alcohol from the heated, alcohol-enriched alcohol removing liquid comprises removing at least a portion of the alcohol from the heated, alcohol-enriched alcohol removing liquid by suction under vacuum, and said means for removing at least a portion of the alcohol from the heated, alcohol-enriched alcohol removing liquid comprises at least one vacuum stripping column.

15. The method according to claim 14, wherein:

said heating the alcohol-enriched alcohol removing liquid from said at least one dialysis column comprises heating the alcohol-enriched alcohol removing liquid to one of:
the operating temperature of said vacuum stripping column, and
a temperature greater than the operating temperature of said vacuum stripping column; and said cooling of the alcohol removing liquid in said cooling means comprises cooling the alcohol removing liquid about 8° to about 20° below the operating temperature of said vacuum stripping column.

16. A method for removing at least a portion of the alcohol from a beverage, said method comprising the steps of:

cooling an alcohol removing liquid in a cooling means to produce cooled alcohol removing liquid;

conducting the cooled alcohol removing liquid from said cooling means and a beverage to a means for removing at least a portion of the alcohol from the beverage:

transferring at least a portion of the alcohol from the beverage to the cooled alcohol removing liquid in said means for removing at least a portion of the alcohol from the beverage to thereby produce at least partially de-alcoholized beverage and alcohol-enriched alcohol removing liquid:

conducting the alcohol-enriched alcohol removing liquid from said means for removing at least a portion of the alcohol from the beverage to a heating means;

heating the alcohol-enriched alcohol removing liquid from said means for removing at least a portion of the alcohol from the beverage in said heating means, said heating comprising:

pre-heating the alcohol-enriched alcohol removing liquid from said means for removing at least a portion of the alcohol from the beverage in a first heat exchange means to thereby produce pre-heated, alcohol-enriched alcohol removing liquid, and heating the pre-heated alcohol enriched alcohol removing liquid from said first heat exchange means in a second heat exchange means to thereby producing heated, alcohol-enriched alcohol removing liquid:

conducting the heated, alcohol-enriched alcohol removing liquid from said heating means to a means for removing at least a portion of the alcohol from the heated, alcohol-enriched alcohol removing liquid;

removing at least a portion of the alcohol from the heated, alcohol-enriched alcohol removing liquid from said heating means in said means for removing at least a portion of the alcohol from the heated, alcohol-enriched alcohol removing liquid to thereby produce further alcohol removing liquid; and conducting the further alcohol removing liquid from said means for removing at least a portion of the alcohol from the heated, alcohol-enriched alcohol removing liquid to said cooling means.

17. The method according to claim 16, wherein:

said cooling comprises cooling the alcohol removing liquid in said first heat exchange means;

said cooling in said first heat exchange means comprises transferring heat from the alcohol removing liquid from said means for removing at least a portion of the alcohol from the heated, alcohol enriched alcohol removing liquid to the alcohol-enriched alcohol removing liquid from said means for removing at least a portion of the alcohol from the beverage: and said heating the pre-heated, alcohol-enriched alcohol removing liquid in said second heat exchange means comprises transferring heat from a heating liquid to the pre-heated alcohol removing liquid.

18. The method according to claim 17, further including:

condensing, in a condenser, the at least a portion of the alcohol removed from the heated, alcohol-enriched alcohol removing liquid in said means for removing at least a portion of the alcohol from the heated, alcohol-enriched alcohol removing liquid; and additionally cooling the cooled alcohol removing liquid from said first heat exchange means in a third heat exchange means prior to said removing at least a portion of the alcohol from the beverage in said means for removing at least a portion of the alcohol from the beverage.

19. The method according to claim 13, wherein:

said removing at least a portion of the alcohol from the beverage comprises removing at least a portion of the alcohol from the beverage by dialysis, and said means for removing at least a portion of the alcohol from the beverage comprises at least one dialysis chamber:

said removing at least a portion of the alcohol from the heated alcohol-enriched alcohol removing liquid comprises removing at least a portion of the alcohol from the heated alcohol-enriched alcohol removing liquid by suction under vacuum, and said means for removing at least a portion of the alcohol from the heated, alcohol-enriched alcohol removing liquid comprises at least one vacuum stripping column.

20. The method according to claim 19, wherein:
said heating the alcohol-enriched alcohol removing liquid from said means for removing at least a portion of the alcohol from the beverage comprises heating the alcohol-enriched alcohol removing liquid to one of:
the operating temperature of said vacuum stripping column, and
a temperature greater than the operating temperature of said vacuum stripping column: and
said cooling of the alcohol removing liquid in said cooling means comprises cooling the alcohol removing liquid about 8° to about 20° below the operating temperature of said vacuum stripping column.

* * * * *